March 14, 1933.   J. C. G. SALONE ET AL   1,901,380
PARACHUTE EQUIPMENT
Filed Aug. 27, 1931   5 Sheets-Sheet 1
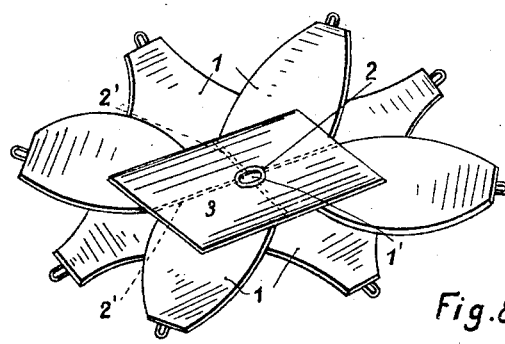
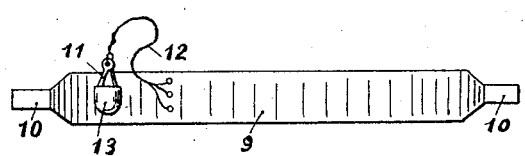
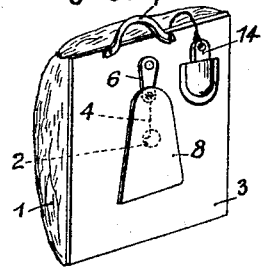
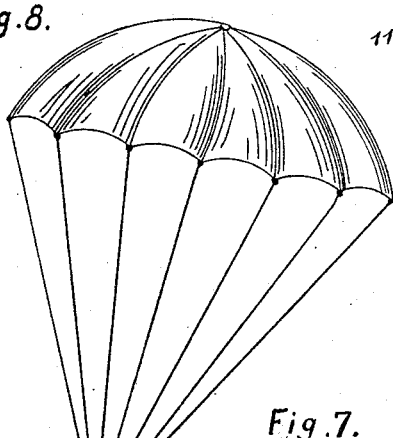
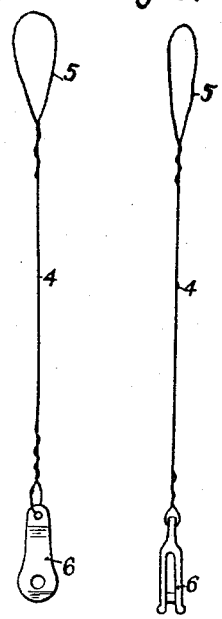
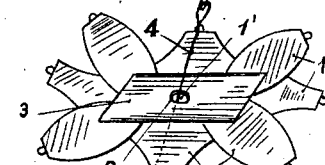
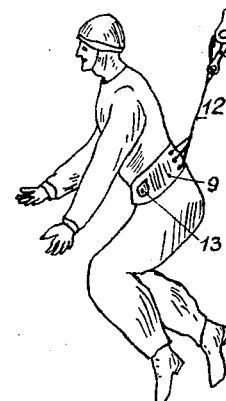
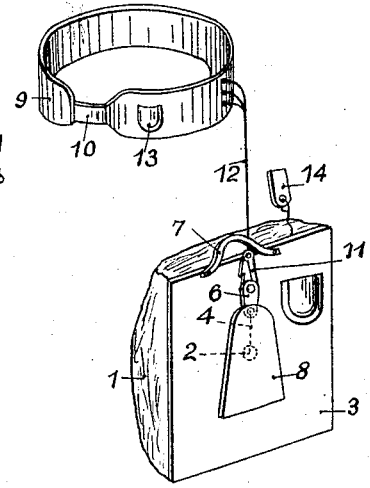
J. C. G. Salone
G. D. Lucas
INVENTORS
By Marks & Clerk
Attys.

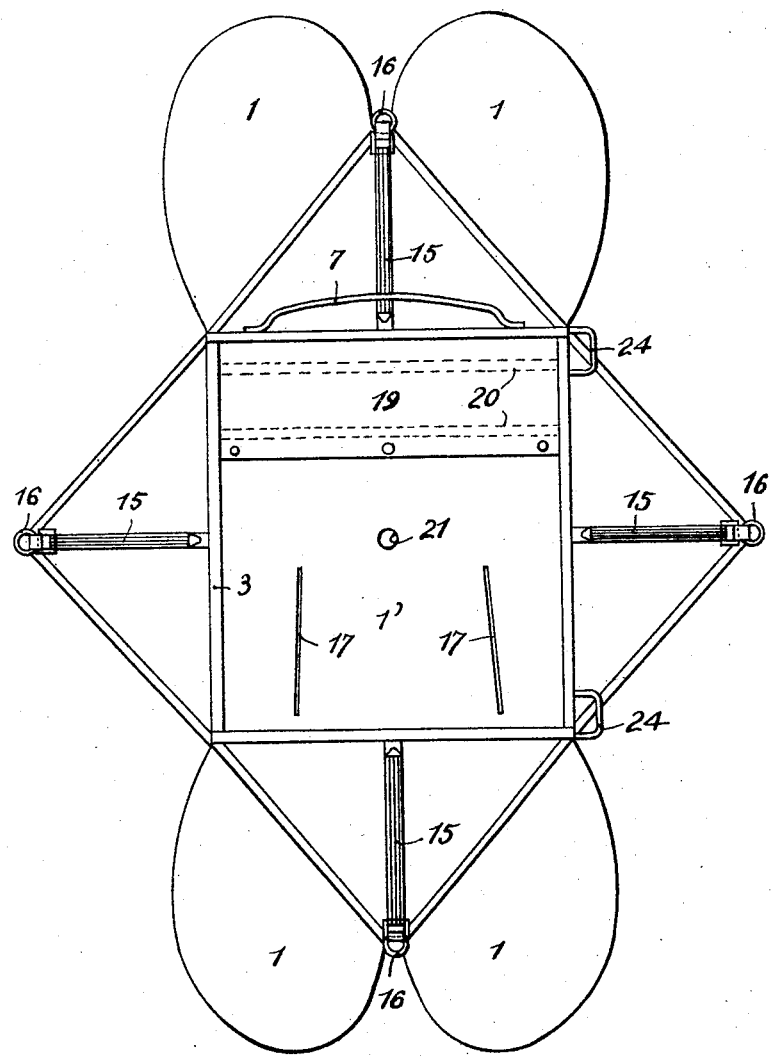

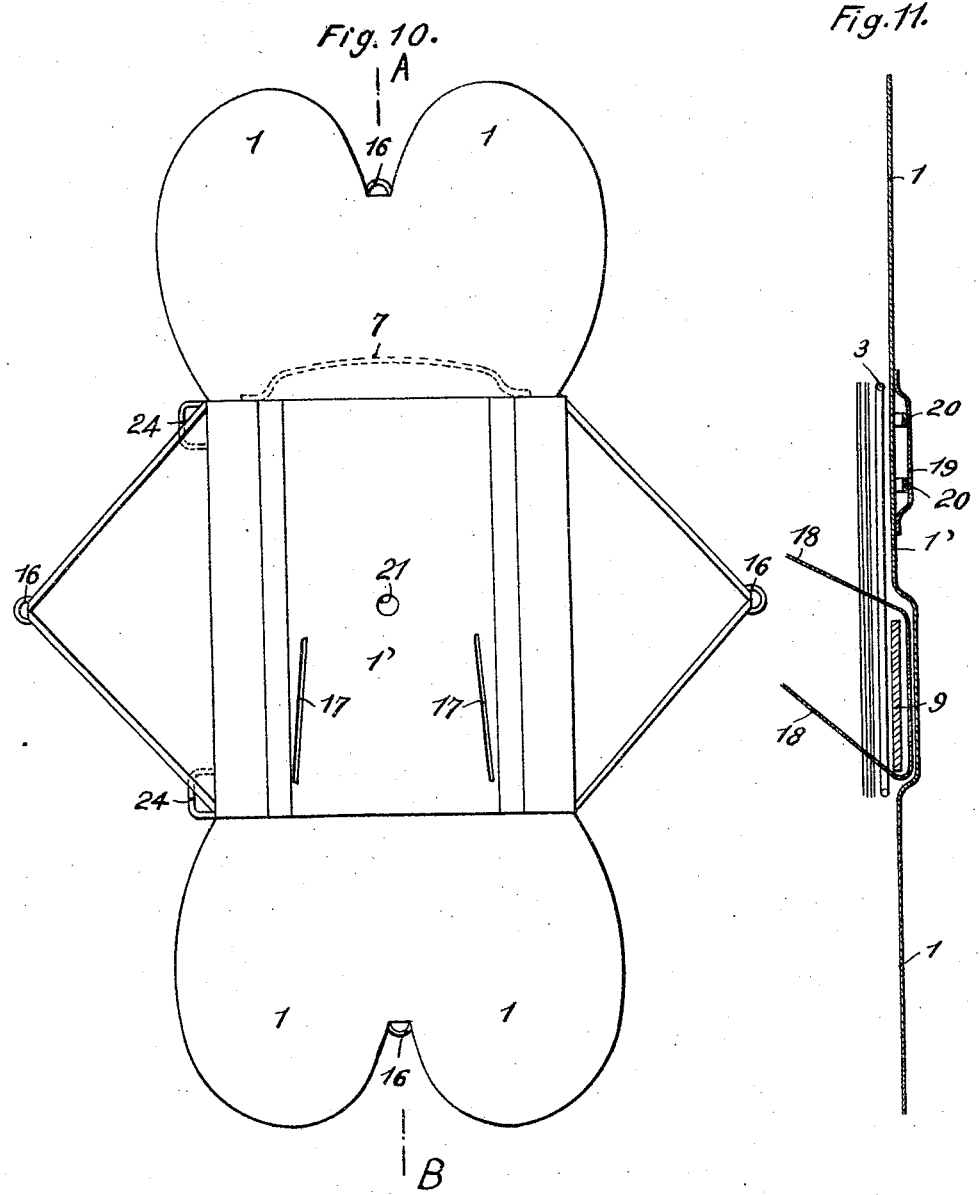

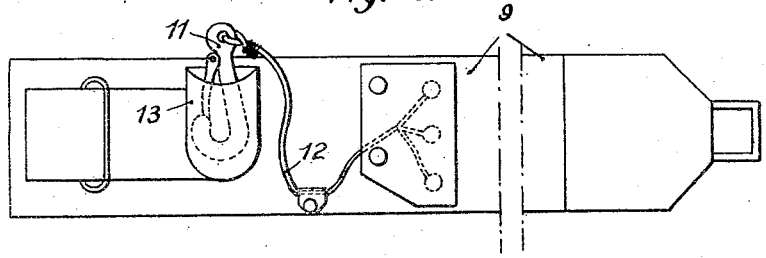
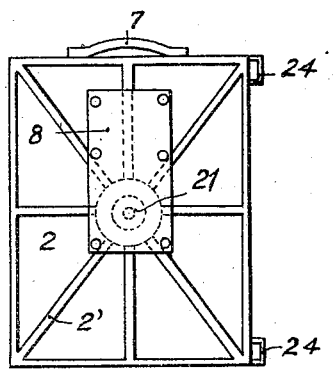
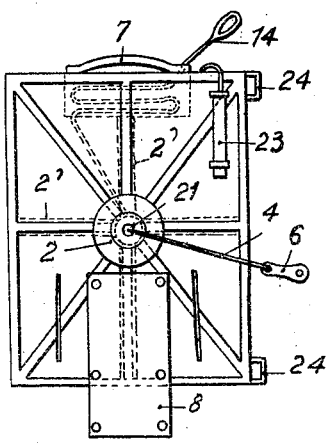

March 14, 1933. J. C. G. SALONE ET AL 1,901,380
PARACHUTE EQUIPMENT
Filed Aug. 27, 1931  5 Sheets-Sheet 5

J. C. G. Salone
G. D. Lucas
INVENTORS
By Marks & Clerk
Attys.

Patented Mar. 14, 1933

1,901,380

UNITED STATES PATENT OFFICE

JACQUES CHARLES GERMAIN SALONE AND GEORGES DENIS LUCAS, OF PARIS, FRANCE, ASSIGNORS TO SOCIÉTÉ SALONE, ING. E. C. P. & LUCAS, OF PARIS, FRANCE

PARACHUTE EQUIPMENT

Application filed August 27, 1931, Serial No. 559,788, and in France September 12, 1930.

The parachute equipments generally employed comprise a bag in which the parachute is packed and which is secured to the belt, either on the back of the person who is to use it or to said person's seat.

Such an arrangement may be satisfactory in the case of aviators who remain in the same place in their airplane, but it becomes a hinderance and, even, an impossibility, in the case of passengers whose functions require that they be able to displace themselves in multiplace airplanes. A bag permanently secured to the aviator is an encumbrance under all circumstances, on account of its volume however small it may be. To avoid this aviators sometimes prefer not to be burdened with the apparatus.

On the other hand, if the parachute equipment is left in some place, together with its belt, to be fastened on according to possible needs, this entails the obligation of placing said equipment in a well determined place in the airplane, as it would be awkward to carry it about when moving from one place to the other. Yet, in multiplace airplanes, such as those equipped for warfare or commercial transport, such displacements frequently occur, moreover, in case of danger, the rapid fastening on of the equipment belt is practically impossible, particularly if said belt is, as it should be, adjusted to the size of the wearer.

Therefore, at the present time, passengers in multiplace airplanes, and particularly in closed airplanes, cannot have parachute equipments adapted to be used with proper convenience.

To remedy this inconvenience, equipments, called "cabin equipments", have been devised. According to these devices, the parachute bag is fixed, permanently or not, to the fuselage, a cable of appropriate length, one end of which can be fastened rapidly to the belt permanently worn by the aviator, being fastened, at the other end, to the parachute. This device is certainly an improvement, as it does away with the difficult and even impossible fastening on of an adjusted belt at a critical moment. On the other hand, it presents the inconvenience of requiring a special place on the fuselage, even entailing the risk of getting caught when being employed. The use of this device presents further difficulties in connection with the application of the well known emergency system of freeing the parachute bag by hand, this being a safety factor in constant use with equipments devised to be permanently fastened to the belt.

The object of my invention is a parachute equipment offering all the advantages of equipments integral with the belt and of so called "cabin equipments", while avoiding all the drawbacks above mentioned.

In the equipment according to my invention, the parachute bag is apart from the belt in normal flight, but it may be rapidly connected to the belt, without effort, through a quick hooking device which also serves to connect the wearer to his parachute.

Said device offers the advantage of being no encumbrance to its wearer who remains simply equipped with the belt, during normal flight.

The bag is provided with a handle allowing it to be carried by hand under all circumstances.

An essential characteristic of the device according to my invention is the simultaneous employment of the parts hereinafter mentioned:

1.—A rapid buckling and unbuckling belt, of any type whatsoever, fastened permanently on the wearer, to which is secured, through any suitable means, a cable or any similar part, provided with an organ which may be hooked rapidly, such as a hook or any adequate locking device liable to be tucked into a small pocket on the belt. Said cable must be sufficiently slack to allow of catching hold of the hooking device and handling it without difficulty.

2.—A parachute bag of any type whatsoever, provided with a handle so that it may be carried about in the same way as any hand bag, the surface of said bag being perforated and reinforced at a certain point, so as to provide a passage for the connecting cable. Said hole might also be provided in one of the flaps, for instance, or in the bottom of the bag.

3.—A connecting cable, fastened to the ropes of the parachute through any suitable means, extends outwardly from the bag through the above mentioned hole, its outer extremity being fitted with an appropriate device to insure its being rapidly fastened to the hooking device on the belt (a loop, or ring, for instance, in the case of a belt hook). Said cable must be sufficiently slack to allow of its being handled conveniently, as indicated above with regard to the belt cable.

4.—An emergency hand releasing device, of any kind whatsoever, is secured to the bag where it may be easily reached under any circumstances.

The above equipment, called "hand bag equipment," may be employed by its owner as he wishes through a simple transformation of the bag, i. e., according to his functions on board the airplane, the aviator may fasten it on his back or use it as a seat bag.

To allow of the equipment being fastened on the back of its owner, the bottom of the bag, which has a metallic lining, is provided, supplementarily to the hole which allows for the passage of a strap, with two slots into which the belt may be inserted, said belt being directly supported by the suspension ropes without the intermediary of any strap between said slots.

For the use of the bag as a seat equipment, the skirt is bordered by two strong straps which pass through two rings fastened to the bag. Said straps, together with the extremities of the suspension ropes, secure the belt.

In the removable skirt a passage is provided for the suspension ropes.

Lastly, an adjusting device is provided, so that the length of the cable regulating the hand release device may be varied according to the method adopted in the use of the bag according to my invention.

Preferred embodiments of my invention will be hereinafter described with reference to the accompanying drawings given merely by way of example and in which:

Fig. 1 is a view of the parachute bag of the "hand bag equipment" open, showing the perforation in the bottom;

Figs. 2 and 3 show the connecting cable with its stirrup;

Fig. 4 shows the hook with the cable for connecting it to the belt;

Fig. 5 shows the belt;

Fig. 6 shows the bag closed, with the parachute folded inside;

Fig. 7 shows the bag hooked to the belt when the parachute is to be used;

Fig. 8 shows the disposition of the different parts when the parachute is being used;

Fig. 9 is an outside view of the bag;

Fig. 10 is an inside view of the same bag;

Fig. 11 is a sectional view of the bag on line A—B of Fig. 10;

Figs. 12 and 13 are elevational views of the bag equipped as a hand bag;

Fig. 14 is a partial view of the belt for the same equipment;

Fig. 15 shows the connecting cable;

Figure 16:
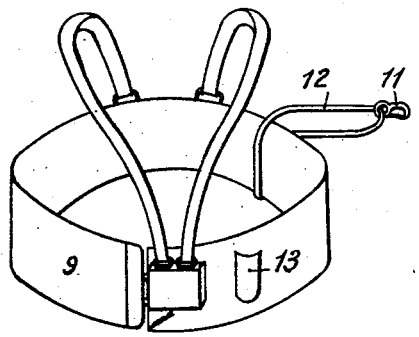
Fig. 16 is a view of the belt for the same equipment.
Figure 17:
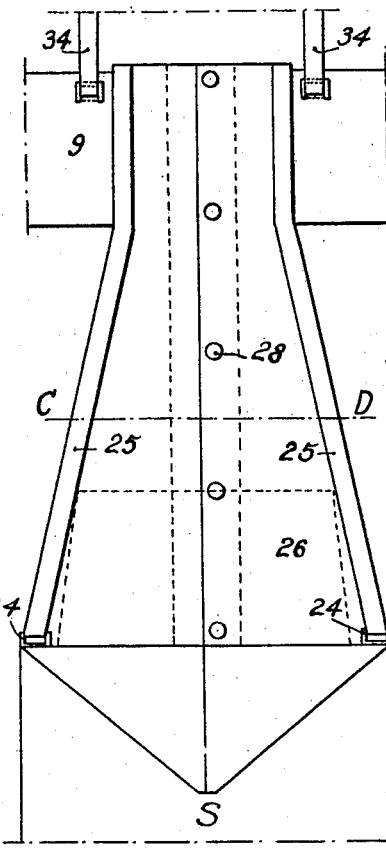
Fig. 17 shows the mounting of the bag in view of a seat equipment.

Bag 1 (Figs. 1 and 2) is provided with a perforated bottom 1', reinforced by a ring 2, made integral, through straps 2' sewn thereto, with a frame 3 which forms the bottom armature. Cable 4 passes through said ring 2, loop 5 being inside the bag and stirrup 6 being at the outer extremity of said cable 4. The ropes of the parachute are fastened to loop 5 and the parachute is folded inside the bag in the usual manner. The closed bag (Fig 6) is provided with a handle 7 and with a cloth flap 8, the latter protecting that part of cable 4 which issues from the bag, stirrups 6 being ready for use.

The passenger fastens on belt 9, provided with a quick hooking and unhooking buckle 10, of any type whatsoever (Fig. 5). Said belt 9 comprises a cable 12 on which is mounted a hook 11 and which is fixed to the belt by any suitable means. Normally, the hook should be found in the small pocket 13 with which belt 9 is provided.

In order to make use of the parachute (Figs. 7 and 8) it is sufficient to hook on the bag (placed, during a normal journey, in any part of the airplane and being consequently, if so desired, always handy when needed). To this effect, the passenger catches hold of stirrup 6 with one hand, while drawing hook 11 out of pocket 13 with the other. Stirrup 6 and hook 11 can then be hooked on to each oher instantaneously and without effort, due to the slackness of cables 4 and 12. The only thing left to do is to jump into space in the usual way, carrying bag 1 in one hand or leaving it to float behind, while releasing said bag 1 by hand through handle 14 (which actuates any kind of hand releasing device for parachute bags). It is even possible to jump out while allowing the well known automatic release gear (which may perfectly well be adapted to the above described parachute hand bag) to work.

The device, while descending, has the aspect shown in Fig. 8.

Upon touching the ground, the passenger frees himself from the whole device instantaneously by unfastening buckle 10 of belt 9.

It is to be noted that belt 9 may also be devised so as to form one piece, through connection to the parachute and airplane by any adequate means.

In Figs. 9 to 20, the parachute bag comprises essentially a metallic frame 3, forming an armature, said frame 3 being either flat or made to fit the shape of the back.

Upon said frame 3 (which may be reinforced with cross pieces), a bottom part 1', made of tissue, is sewn, together with the usual flaps 1 provided with their straps and elastic release bands 15, the whole being gathered together, upon closing the bag, by a breakable thread passing through rings 16.

In the bottom of the bag, two reinformed slots 17—17 are provided, their length being equal to the height of belt 9.

When it is desired to fix the device on the passenger's back, belt 9 is slipped through said slots 17—17.

Instead of connecting belt 9 to the parachute by means of a strap, the suspension cables 18 are gathered inside a tissue casing and support belt 9 between the two slots of the bag.

A small pocket 19 is provided in the top part of the bag. Into said pocket 19 the automatic release cable is coiled up, said cable being held in position by means of elastic bands 20, in the way described in the French patent filed by the applicant on February 3, 1931, for "improvements to parachute bags."

Belt 9 is provided with shoulder straps and a buckle, of a suitable type, liable to be promptly hooked and unhooked.

The bag may also be used under the form of the so called "hand bag" equipment, described with reference to Figs. 1 to 8.

In this latter case, said bag will comprise, at the bottom, as shown in Figs. 1 to 9, a central hole 21, the edges of which are reinforced by a ring 2, made integral with armature 3 through straps 15. Through said hole 21 passes the connecting cable or strap 4, which may be made of tissue (silk strapping, preferably) or of metallic cable.

Inside the bag, the suspension cables, gathered up by a casing, are tied to loop 5 of cable 4 by a knot.

A tissue flap 8, secured through press buttons, protects the issuing cable, stirrup 6 being ready for use outside the bag.

A snap hook 11 is connected to belt 9 through cable 12, which supports said belt, or through a strap. During normal flying, said snap hook is left in small pocket 13 provided on belt 9.

Bag 1 comprises a handle 7, allowing it to be carried about easily when the passenger changes places in the airplane.

When it is desired to use the parachute, all that is necessary is to catch hold of stirrup 6 and to hook thereto the snap hook 11. Having jumped into space, the passenger releases the bag by hand, by means of leather handle 23. An automatic release system 14 may also be combined with this "hand bag equipment".

Lastly, bag 1 may be equipped as a seat bag.

To this ends (Fig. 17), two strong rings 24—24 have been fixed onto bag S, straps 25—25, which support belt 9, passing through said rings.

Said straps form a kind of a frame for a tissue skirt 26.

The latter is provided with a recess 27, through which the suspension ropes are allowed to pass, said suspension ropes, issuing from the bag, supporting the belt directly, as in the case of a bag fitted to be fastened on passenger's back. Skirt 26 is closed up by means of press buttons 28, after the suspension ropes have been put into place. 34 represents the shoulder straps in Fig. 17.

It is to be noted that the length of the cable governing the hand release varies according to the position of handle 23, through which it is operated.

Said handle 23 of the "hand bag equipment" being secured to the bag itself, the length of the hand release cable will be shorter than in the case of a seat bag or of a bag to be carried on the back of its owner.

Figure 19:
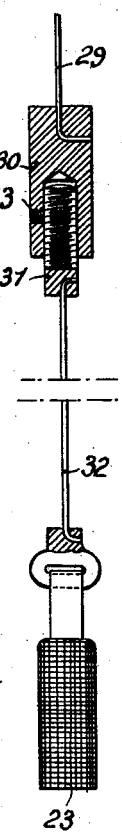
Figs. 19 and 20 show devices for adjusting the length of the cable for hand release.
Figure 20:
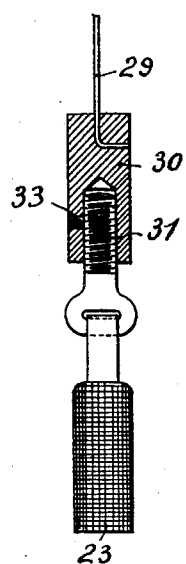
Figure 18:
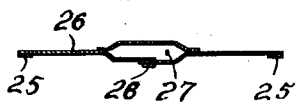
Fig. 18 is a diagrammatic view on line C—D of Fig. 17.

In order to get the length of cable required in each case, the device represented in Fig. 19 (for the two last mentioned cases) and in Fig. 20 (in the case of a hand bag equipment) may be used.

The extremity of hand release cable 29 opposite the release shearing device is provided with a cylindrical nut 30 on which is screwed a threaded rod 31 which carries leather handle 23 or which is connected to the latter through cable 32.

A clamping screw 33 exerts a pression on the threads of rod 31 and prevents any loosening from taking place.

While I have disclosed what I deem to be preferred embodiments of my invention, I do not wish to be limited thereto, as there might be changes made in the construction, disposition and form of the parts, without departing from the principles of my invention as comprehended within the scope of the appended claim.

What I claim is:

A parachute equipment of the type described comprising in combination, a parachute, a cable connected to the suspension ropes of said parachute, a bag provided with a hole in its bottom for the passage of said cable, said bag being adapted to normally contain said parachute, a belt normally carried by the passenger, means for quickly connecting said belt to said cable, a skirt, two strong straps, disposed along the edges of said skirt and secured to said belt, two rings on the bag for receiving said straps, whereby the bag may be used as a seat equipment.

The foregoing specification, of our "a parachute equipment," signed by us this 18th day of August, 1931.

JACQUES CHARLES GERMAIN SALONE.
GEORGES DENIS LUCAS.